(12) United States Patent
Collins

(10) Patent No.: US 10,053,127 B2
(45) Date of Patent: Aug. 21, 2018

(54) UTILITY CART AND DOCKING APPARATUS THERE FOR

(71) Applicant: Chad Anthony Collins, Temple, TX (US)

(72) Inventor: Chad Anthony Collins, Temple, TX (US)

(*) Notice: Subject to any disclaimer, the term of this patent is extended or adjusted under 35 U.S.C. 154(b) by 0 days.

(21) Appl. No.: 15/867,359

(22) Filed: Jan. 10, 2018

(65) Prior Publication Data

US 2018/0127009 A1    May 10, 2018

Related U.S. Application Data

(63) Continuation of application No. 15/489,269, filed on Apr. 17, 2017, now Pat. No. 9,884,639, which is a continuation of application No. 14/813,984, filed on Jul. 30, 2015, now Pat. No. 9,731,743.

(60) Provisional application No. 62/197,727, filed on Jul. 28, 2015, provisional application No. 61/999,730, filed on Aug. 4, 2014.

(51) Int. Cl.
*B62D 51/04* (2006.01)
*B60P 3/20* (2006.01)
*B62B 5/00* (2006.01)
*B60D 1/58* (2006.01)
*B62B 5/04* (2006.01)
*B60D 1/00* (2006.01)

(52) U.S. Cl.
CPC .............. *B62B 5/0033* (2013.01); *B60D 1/58* (2013.01); *B62B 5/0003* (2013.01); *B62B 5/0404* (2013.01); *B60D 2001/005* (2013.01)

(58) Field of Classification Search
CPC .......... B60P 3/20; B60P 3/007; B60P 3/0257; B62D 51/04
See application file for complete search history.

(56) References Cited

U.S. PATENT DOCUMENTS

| | | | | |
|---|---|---|---|---|
| 5,870,897 A | * | 2/1999 | Barr | F25D 3/105 62/434 |
| 6,216,488 B1 | * | 4/2001 | Rucker | A45B 11/00 62/331 |
| 2007/0295562 A1 | * | 12/2007 | Burton | B62B 1/12 187/233 |

* cited by examiner

*Primary Examiner* — Bryan A Evans
(74) *Attorney, Agent, or Firm* — Christopher & Weisberg, P.A.

(57) ABSTRACT

Some embodiments include a utility cart. In some embodiments, the utility cart includes an insulated cold storage compartment; a dry storage compartment, the dry storage compartment configured to retract-ably extend horizontally; a base and front and rear wheels connected to the base.

20 Claims, 9 Drawing Sheets

UTILITY CART AND DOCKING APPARATUS THERE FOR

CROSS-REFERENCE TO RELATED APPLICATION

This application is a continuation application of U.S. Ser. No. 15/489,269, filed Apr. 17, 2017, which is related to U.S. Ser. No. 14/813,984, filed Jul. 30, 2015, which is related to and claims priority to U.S. Provisional Patent Application No. 61/999,730, filed on Aug. 4, 2014, entitled "MY CART SYSTEM" and U.S. Provisional Patent Application No. 62/197,727, filed on Jul. 28, 2015, entitled "TOWABLE MULTI-PURPOSE CART", the entirety of which are all incorporated herein by reference.

FIELD OF THE INVENTION

The present invention relates to a method and system for a utility cart and docking apparatus for the utility cart.

SUMMARY OF THE INVENTION

Embodiments described herein advantageously provide a utility cart and docking apparatus for docking the utility cart. Some embodiments include a utility cart docking apparatus configured to hold a utility cart remove-ably position-able onto the docking apparatus. The docking apparatus includes a frame, the frame having first arms foldable to a closed position and un-foldable to an open position and further configured to pivot to wrap around the utility cart. The docking apparatus includes a second arm extending from the frame and mate-able to a receiver hitch of an automobile. The docking apparatus includes a first gear affixed to remain stationary with respect to the second arm; and a second gear meshed with the first gear and affixed to remain stationary with the frame, the second gear moveable with respect to the first gear so that when the second gear is moved, the frame moves in a vertical direction with respect to the second arm to one of raise and lower the frame.

In some embodiments, the utility cart docking apparatus further includes a set of resting arms configured to be affixed to the frame in substantially horizontal support positions to support the utility cart when the utility cart is positioned to be held by the docking apparatus. In some embodiments, the set of resting arms are remove-able when the utility cart is not held by the docking apparatus. In some embodiments, the set of resting arms are position-able to be mounted against the frame and remove-ably affixed to the frame when the set of resting arms have been removed from the substantially horizontal support positions. In some embodiments, the first arms are hinged to be foldable to a first position to securely hold the utility cart, and foldable to a second position when the utility cart is not being securely held by the docking apparatus. In some embodiments, the first arms are telescoping. In some embodiments, the frame of the docking apparatus is lower-able to a position where the utility cart rests upon a ground and raise-able to a position where the utility cart is suspended above the ground. In some embodiments, the frame is driven by a motor that turns one of the first and second gears.

Some embodiments include a utility cart. In some embodiments, the utility cart includes an insulated cold storage compartment; a dry storage compartment, the dry storage compartment configured to retract-ably extend horizontally; and front and rear wheels.

In some embodiments, the utility cart further includes a pivot-able handle. In some embodiments, the cold storage compartment is refrigerated. In some embodiments, the utility cart includes a rechargeable battery to power refrigeration of the cold storage compartment. The rechargeable battery may be recharged from a battery of a vehicle or from another power source. In some embodiments, the utility cart includes a leverage foot pad providing leverage to tilt the utility cart backward onto the rear wheels to enable the cart to be pulled up a flight of stairs. In some embodiments, the utility cart includes a wireless transceiver to communicate with at least one of a point-of-sale device and a mobile device. In some embodiments, the utility cart has a display. In some embodiments, the utility cart further includes at least one weight sensor to weigh contents of at least one of the dry storage compartment and the cold storage compartment. In some embodiments, the utility cart further includes a wireless transceiver to communicate a weight of the contents to a point-of-sale device. In some embodiments, the utility cart further includes an electrical brake locking apparatus configured to electrically lock a brake applied to at least one of the front and rear wheels. In some embodiments, the utility cart further includes at least one docking sleeve configured to receive arms of a utility docking apparatus. In some embodiments, the utility cart includes a motor to drive at least the rear wheels.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
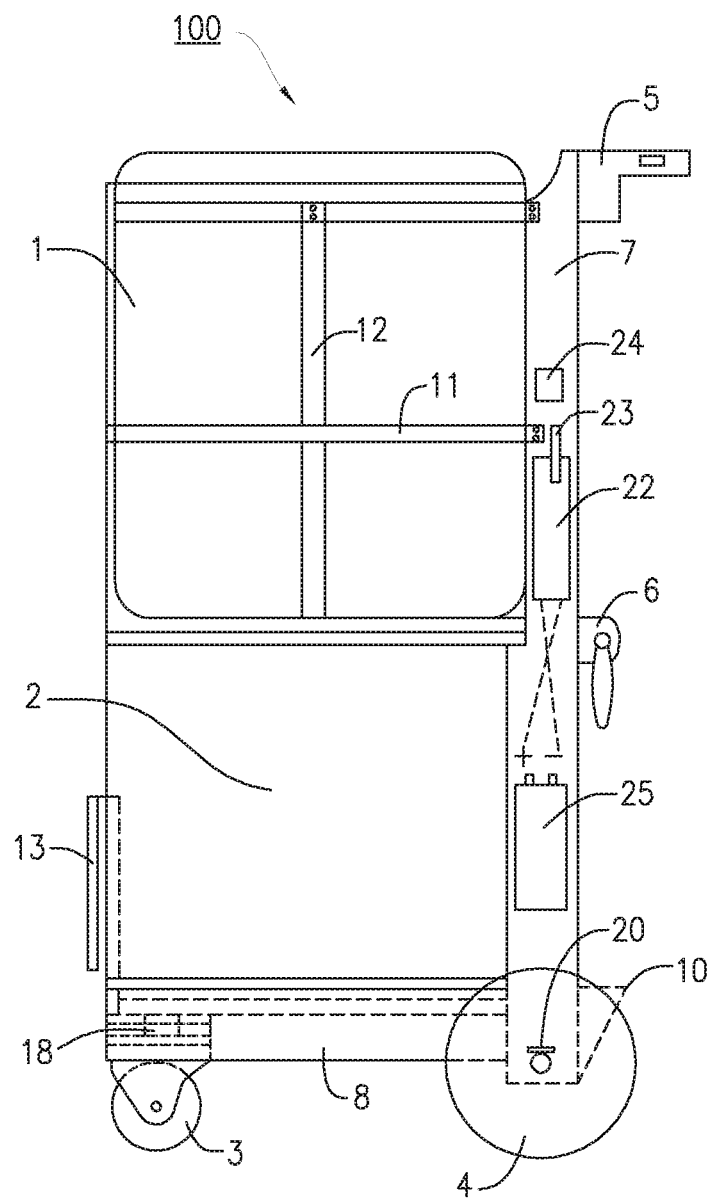
FIG. 1 is a side view of a utility cart constructed in accordance with principles described herein.

Before describing in detail example embodiments that are in accordance with the present disclosure, it is noted that the embodiments reside primarily in a utility cart and docking apparatus for the utility cart. Accordingly, the embodiments have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
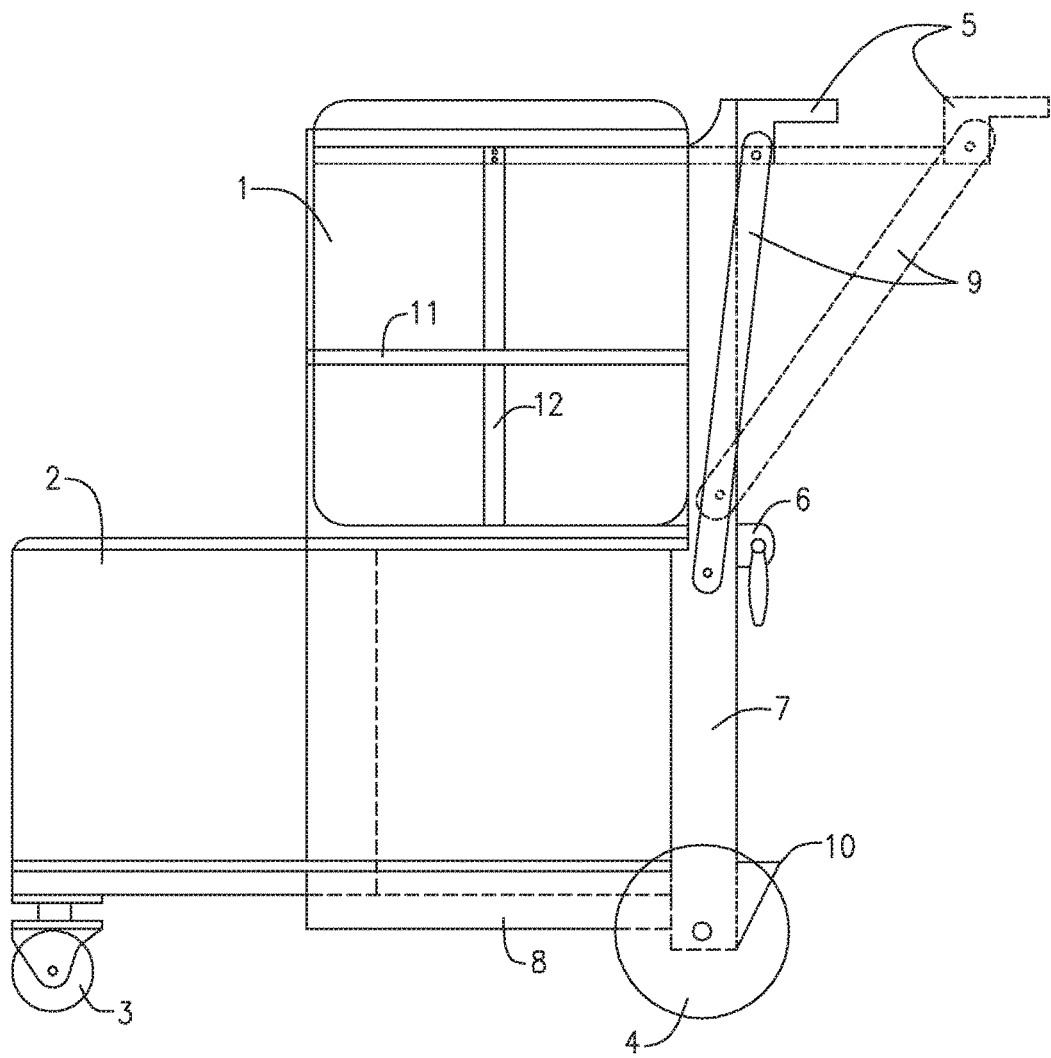
FIG. 2 is a side view of the utility cart with the lower compartment extended.
Figure 3:
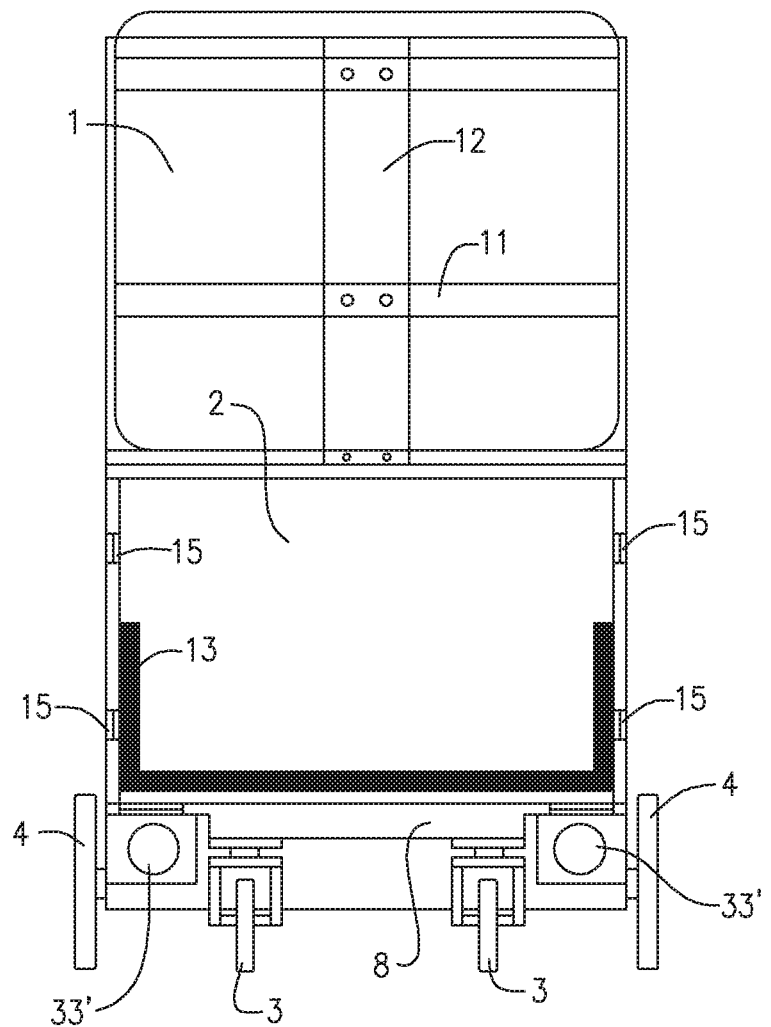
FIG. 3 is front view of the utility cart.
Figure 4:
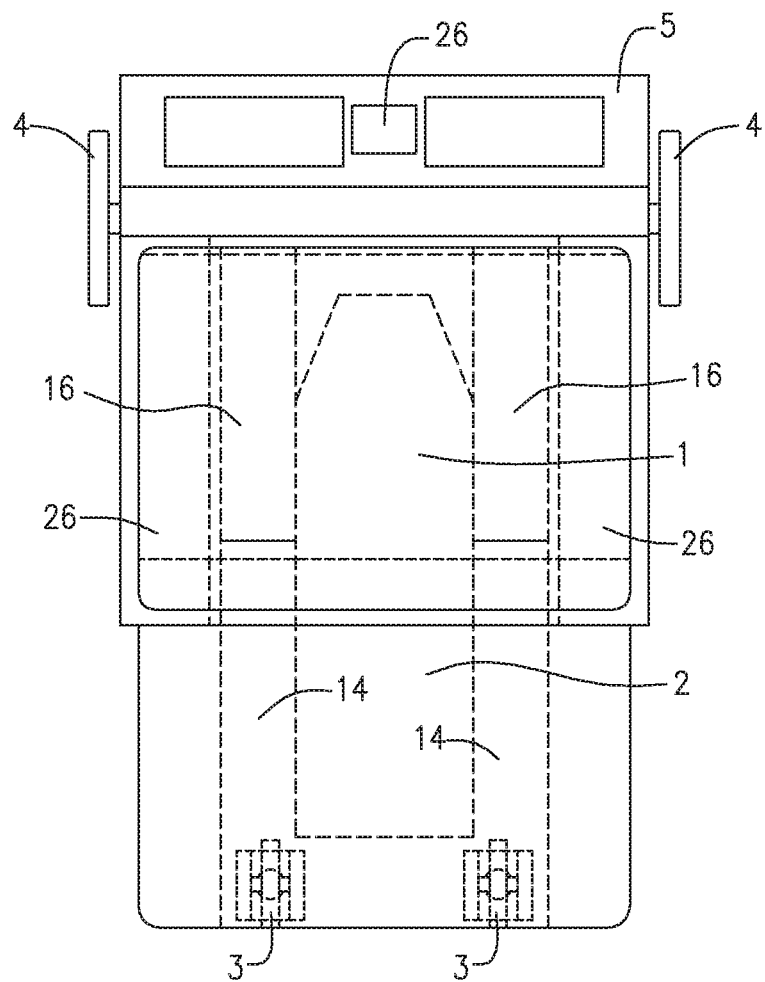
FIG. 4 is a top view of the utility cart.

FIG. 1 is a side view of an embodiment of a utility cart 100. The utility cart 100 has a cold storage compartment 1 above a dry storage compartment 2. FIG. 2 is a side view of the utility cart 100 with the dry storage compartment 2 in an extended position. Thus, the dry storage compartment 2 is retractably extendible by pulling outward on the dry storage compartment 2. FIG. 3 is a front view of the utility cart 100. FIG. 4 is a top view of the utility cart 100 with the dry storage compartment 2 in the extended position. In some embodiments, the utility cart 100, when the dry storage compartment 2 is in the fully extended position, is about the size of a typical grocery cart such as those found in grocery stores.

The utility cart 100 has front wheels 3 and rear wheels 4. The front wheels 3 may pivot 360 degrees. The utility cart 100 also has a handle 5 and a grab bar 6. Further, the utility cart has a vertical frame 7 to which the handle 5 and grab bar 6 are attached. The utility cart 100 also has a horizontal extension frame 8 which provides support for the dry storage compartment 2 and possibly also the cold storage compartment 1.

The handle 5 may pivot to a rearward position via of a handle arm 9. A leveraging foot pad 10 enables a user of the utility cart 100 to tilt the utility cart 100 backward to pivot on the rear wheel 4 by pressing a foot down on the leveraging foot pad 10 while pulling backward on the handle 5. This facilitates moving the utility cart 100 up a flight of stairs. Optionally, the rear and/or front wheels 3, 4 can be powered by a motor (not shown). Note that in some embodiments, the front and/or rear wheels can be supplied with a manual or electrical braking system (not shown).

The cold storage compartment 1 may be secured to the vertical frame 7 by horizontal straps 11 and vertical straps 12. The dry storage compartment has a drawer/extension frame latching mechanism to lock the retractably extendible portion of the dry compartment 2 in a retracted or extended position. The dry storage compartment 2 is supported by an extension frame on glide sleeves 14 to achieve the retracted or extended position. Slide glides 15 facilitate the sliding of the retractably extendible dry compartment 2. A bottom glide frame 16 houses the extension frame on glide sleeves 14 that extend when the dry storage compartment 2 is extended.

The utility cart 100 also includes forward weight sensors 18 and rear weight sensors 20 which detect weight of at least the dry storage compartment 2 and its contents. A WiFi transceiver 22 is mounted on the vertical frame 7 and may communicate via an antenna 23 with a wireless access point, point-of-sale terminal or wireless device. A small computer 24 such as a micro-controller may be in communication with at least the sensors 18 and 20, and may be calibrated to determine the weight of the contents of at least the dry storage compartment 2. A rechargeable battery 25 may provide power to the computer 24, the transceiver 22 and possibly also the sensors 18 and 20.

In some embodiments, the sensors 18 and 20 are accelerometers and the computer 24 is calibrated to indicate via a display 26 only the weight of the contents of the dry storage compartment 2 and/or the cold storage compartment 1. The transceiver 22 may receive the contents weight calculated by the computer 24 and communicate the contents weight to a point-of-sale device or inventory tracking system. In some embodiments, the utility cart 100 may also include a bar code reader (not shown) to read bar codes of products to be placed in one of the storage compartments 1 and 2, and the computer 24 may record information associated with the bar codes. Thus, for example, the computer may keep a running total of prices of items placed in the cart as well as a list of the items.

The cold storage component 1 may be insulated and may include a refrigerated compartment refrigerated by a refrigerator (not shown) mounted on the vertical frame 7. In some embodiments, the refrigerator is removably attachable to the utility cart 100 and is powered by the rechargeable battery 25. Also, power may be supplied by a utility vehicle when the utility cart 100 is docked to the docking station 200 described below.

Figure 5:
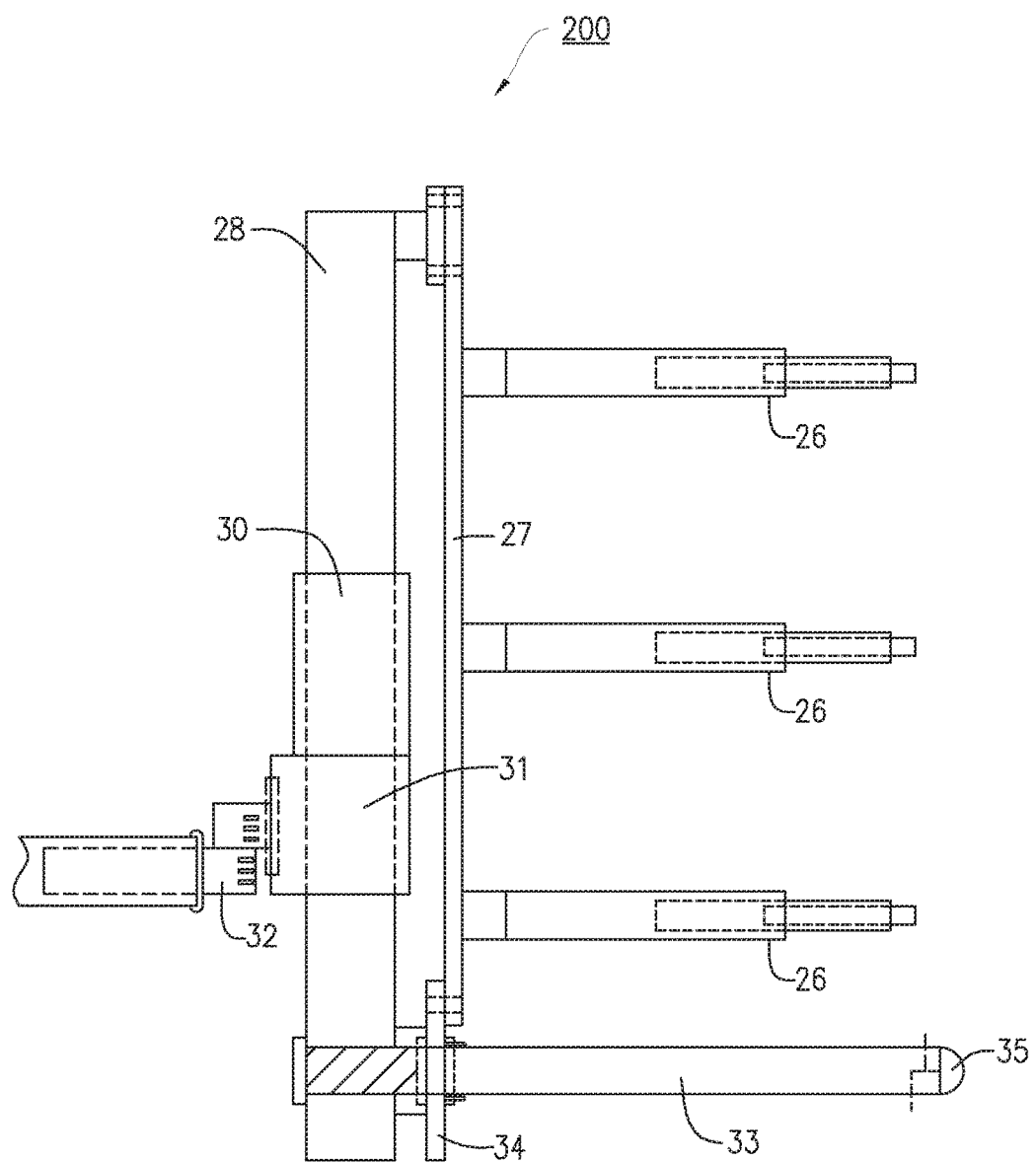
FIG. 5 is a side view of a docking apparatus constructed in accordance with principles described herein.
Figure 6:
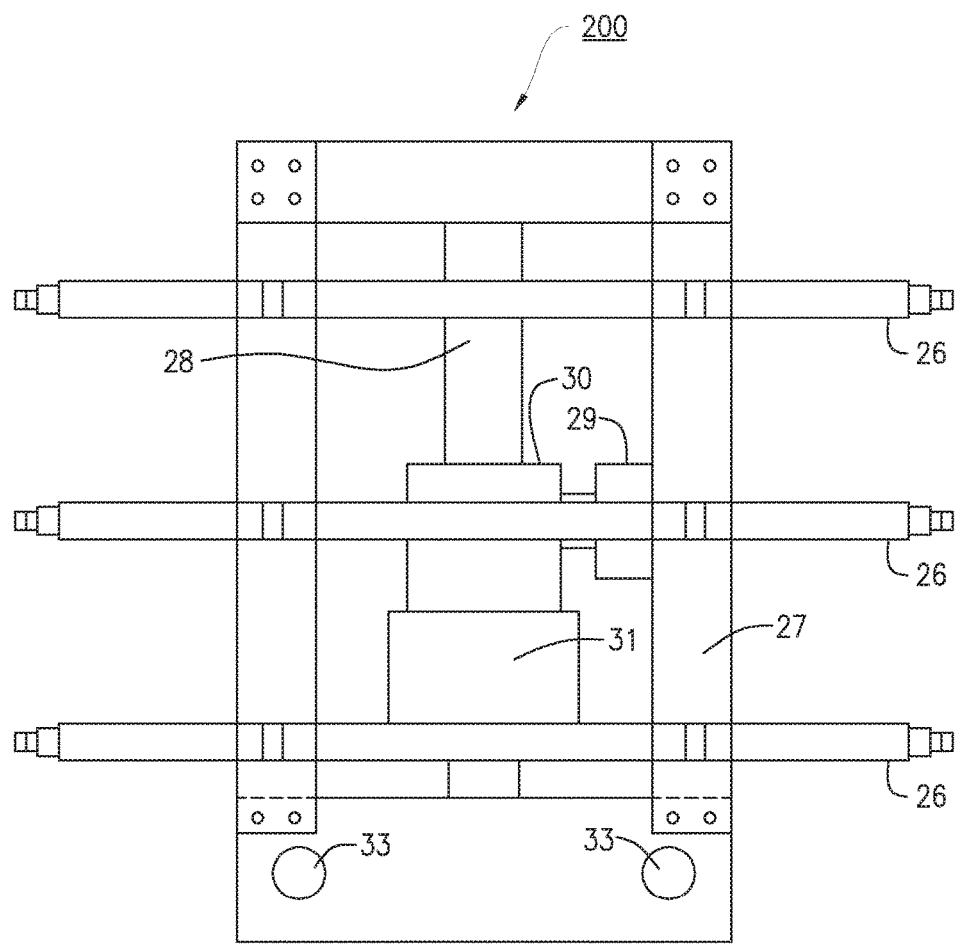
FIG. 6 is a front view of the docking apparatus with folding cage arms rotated outward to a fully open position.
Figure 7:
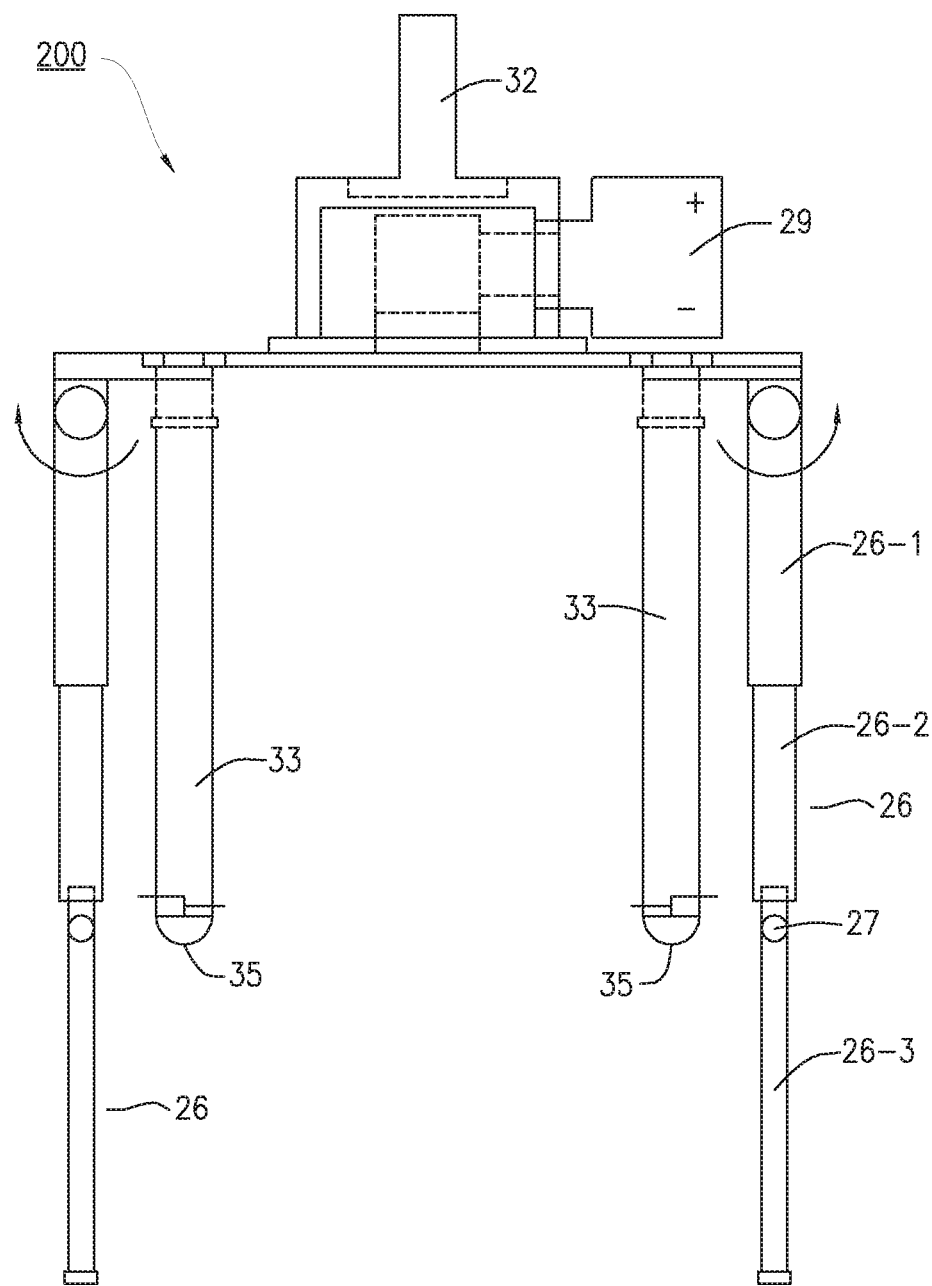
FIG. 7 is top view of the docking apparatus.

Note that the utility cart 100 is specially adapted to be removably secured to a docking apparatus via folding cage arms 26. FIG. 5 is a side view of a docking apparatus 200 configured to carry the utility cart 100. The docking apparatus includes a mast 28. FIG. 6 is a front view of the docking apparatus 200 with open folding cage arms 26. FIG. 7 is a top view of the docking apparatus 200 with the folding cage arms 26 in an extended position.

The docking apparatus has a frame 27 from which the folding cage arms 26 extend. Connected to the frame 27 is the mast 28 and connected to the mast 28 is a motor 29 that drives a gear in a gear box 30 which meshes with a gear in a base box frame 31. The first gear in the base box frame 31 is affixed to remain stationary relative to a hitch insert 32. The second gear of the gear box 30 is meshed with the first gear and is affixed to remain stationary relative to the frame 27. When the gears move in relative motion with respect to each other, the frame 27 is lowered or raised. When the utility cart 100 is docked in the docking apparatus 200, raising or lowering the frame 27 raises or lowers the utility cart 100, thereby lifting the utility cart 100 off the ground and lowering the utility cart 100 to the ground.

The utility cart 100 is docked to the docking apparatus 200 by aligning resting support arms 33 of the docking station 200 with docking sleeves 33' of the utility cart 100 and rolling the cart toward the docking station so that the resting support arms 33 insert into the docking sleeves 33'. The resting support arms 33 may be detachable from the docking apparatus 200 when the resting support arms 33 are not in use. In some embodiments, the resting arms may be mounted against the frame 27 for storage when not in use. The docking sleeves 33' are shown in FIG. 3. The docking arms 33 extend from the bottom support plate 34. In one embodiment, the front wheels 3 are closest to the docking station 200 when docking the utility cart 100 to the docking station 200. Control knobs 35 are for locking the utility cart 100 into a docking position when the resting support arms 33 are inserted into the docking sleeves 33'.

Figure 8:
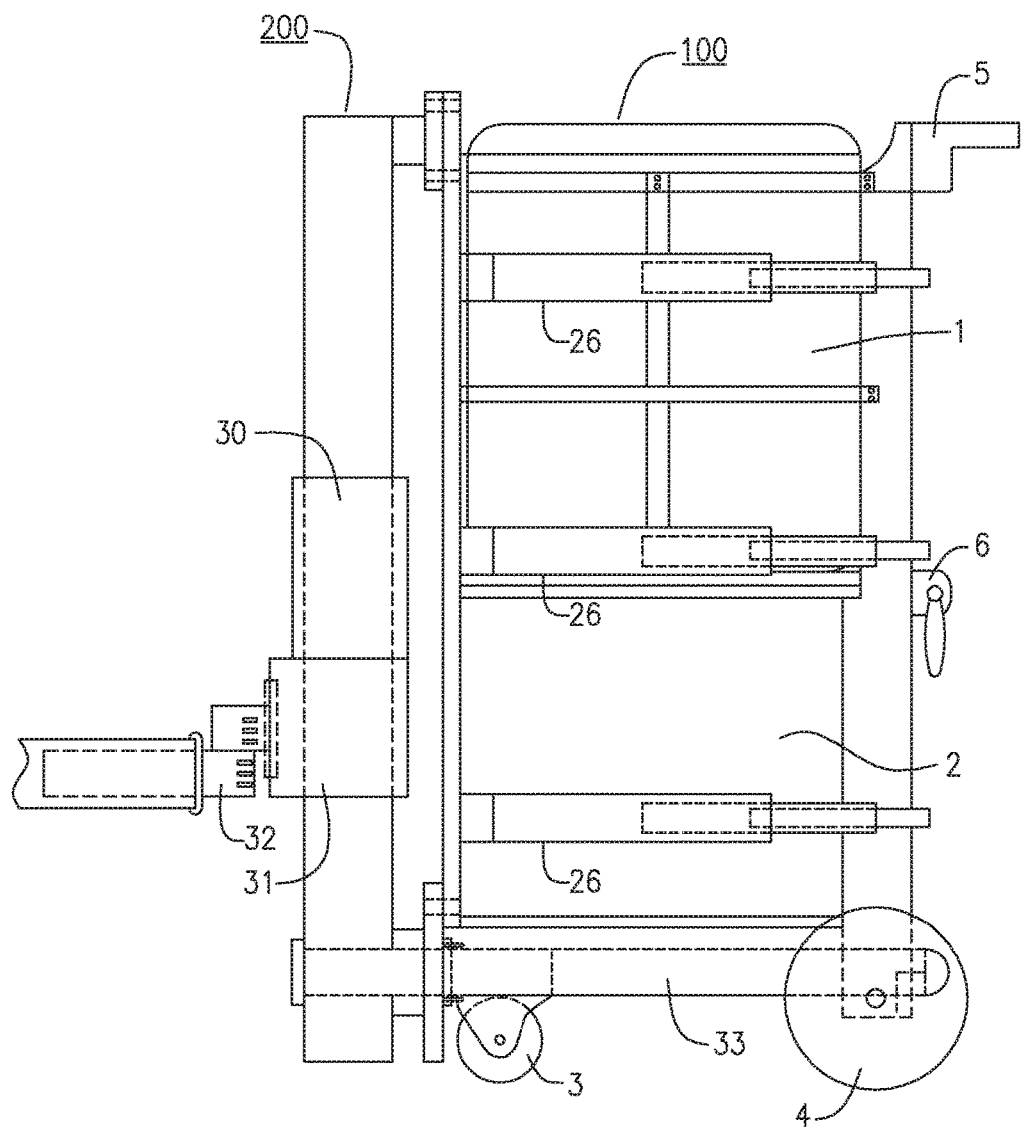
FIG. 8 is a side view of the utility cart docked onto the docking apparatus.

Each of the folding cage arms 26 may consist of a first tier 26-1, a second tier 26-2 and a third tier 26-3. The tiers are telescoping so that the reach of the folding cage arms 26 is maximum when the telescoping tiers are fully extended, and minimum when the telescoping tiers are fully retracted. The third tier 26-3 is hinged to the second tier 26-2 and the first tier 26-1 is hinged to the frame 27. Thus, the entire folding cage arms assembly can swing outward to a fully open position as shown in FIG. 6, or be positioned perpendicular to the frame 27 as shown in FIGS. 5 and 7. Further, the third tier 26-3 can be folded inward to wrap around the utility cart 100 when docked. FIG. 8 illustrates the utility cart 100 docked on the docking station 200. Further, the third tiers of opposite sides of the docking apparatus 200 have a locking mechanism to lock into place opposite corresponding folding cage arms to securely wrap around the utility cart 100.

Figure 9:
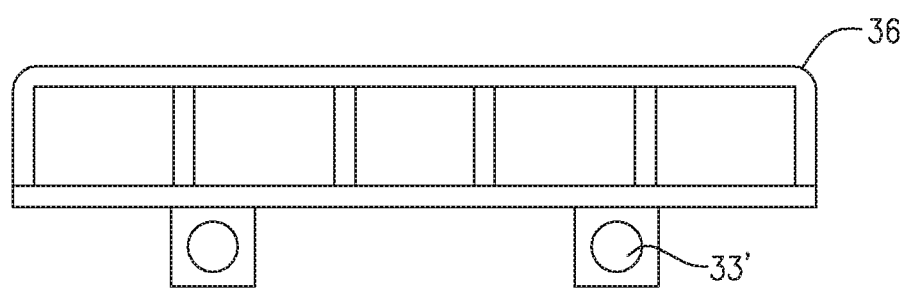
FIG. 9 is a front view of a platform that can be docked to the docking apparatus.

Note that the docking station 200 can be used to dock other objects and equipment such as bicycles. For example, shown in FIG. 9 is a platform 36 with docking sleeves 33' that receive resting support arms 33. This enables other equipment to be carried by the docking apparatus 200.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A utility cart, comprising:
   an insulated cold storage compartment;
   a dry storage compartment, the dry storage compartment configured to retractably extend horizontally relative to the insulated cold storage compartment;
   a base supporting the insulated cold storage compartment and the dry storage compartment;
   front and rear wheels attached to the base; and
   a motor attached to the base and configured to drive at least one of the front and rear wheels.

2. The utility cart of claim 1, further comprising a pivot-able handle connected to the base.

3. The utility cart of claim 2, further comprising a refrigeration unit to refrigerate the cold storage compartment.

4. The utility cart of claim 3, further comprising a rechargeable battery mounted to the pivot-able handle to power the refrigeration unit to refrigerate the cold storage compartment.

5. The utility cart of claim 4, further comprising a wireless transceiver supported by one of the handle, the base, the insulated cold storage compartment and the dry storage compartment to communicate with at least one of a point-of-sale device and a mobile device.

6. The utility cart of claim 5, further comprising a display supported by the handle and configured to display information concerning content of at least one of the insulated cold storage compartment and the dry storage compartment.

7. The utility cart of claim 1, further comprising a leverage foot pad attached to the base, the leverage foot pad providing leverage to tilt the utility cart backward onto the rear wheels.

8. The utility cart of claim 1, further comprising at least one weight sensor attached to the base to weigh contents of at least one of the dry storage compartment and the insulated cold storage compartment.

9. The utility cart of claim 8, further comprising a wireless transceiver to communicate the weight of the contents to a point-of-sale device.

10. The utility cart of claim 1, further comprising an electrical brake locking apparatus configured to electrically lock a brake applied to at least one of the front and rear wheels.

11. The utility cart of claim 1, further comprising at least one docking sleeve attached to the base and configured to receive arms of a utility docking apparatus.

12. A utility cart comprising:
    a first storage compartment;
    a second storage compartment retractably extendible by pulling outward on the second storage compartment from underneath the first storage compartment;
    a base supporting the first and second storage compartments;
    front and rear wheels attached to the base; and
    a bar code reader attachable to at least one of the base and a handle to read bar codes of products to be placed in one of the first and second storage compartment.

13. The utility cart of claim 12, further comprising a handle and a leveraging foot pad attached to the base supporting pivoting of the utility cart on at least one wheel by pressing a foot down on the leveraging foot pad while pulling on the handle.

14. The utility cart of claim 12, further comprising a vertical frame extending upward from the base, the vertical frame to which at least the first storage compartment is releasably strapped.

15. The utility cart of claim 12, further comprising a latching mechanism attachable to the second storage compartment to at least one of latch the second storage compartment in an extended position and latch the second storage compartment in a retracted position.

16. The utility cart of claim 12, further comprising slide glides attachable to the second storage compartment to facilitate sliding the second storage compartment between an extended position and a retracted position.

17. The utility cart of claim 12, further comprising a sensor positioned at the base to determine a weight of at least one of the first and second storage compartment.

18. The utility cart of claim 12, further comprising a computer mounted on one of the base and a handle configured to control the bar code reader and to accumulate an inventory of the contents of at least one of the first and second storage compartment.

19. A utility cart, comprising:
    a first storage compartment configured for dry storage;
    a second compartment being refrigerated;
    a base supporting the first and second storage compartments;
    front and rear wheels attached to the base;
    a refrigeration unit configured to refrigerate the second compartment; and
    a rechargeable battery mounted to a pivot-able handle to power the refrigeration unit.

20. The utility cart of claim 19, further comprising an electrical brake locking apparatus configured to electrically lock a brake applied to at least one of the front and rear wheels.

* * * * *